April 7, 1964
G. FRARESSO ETAL
3,127,724
CUTTER-WINDROWER APPARATUS
Filed May 11, 1961
2 Sheets-Sheet 1
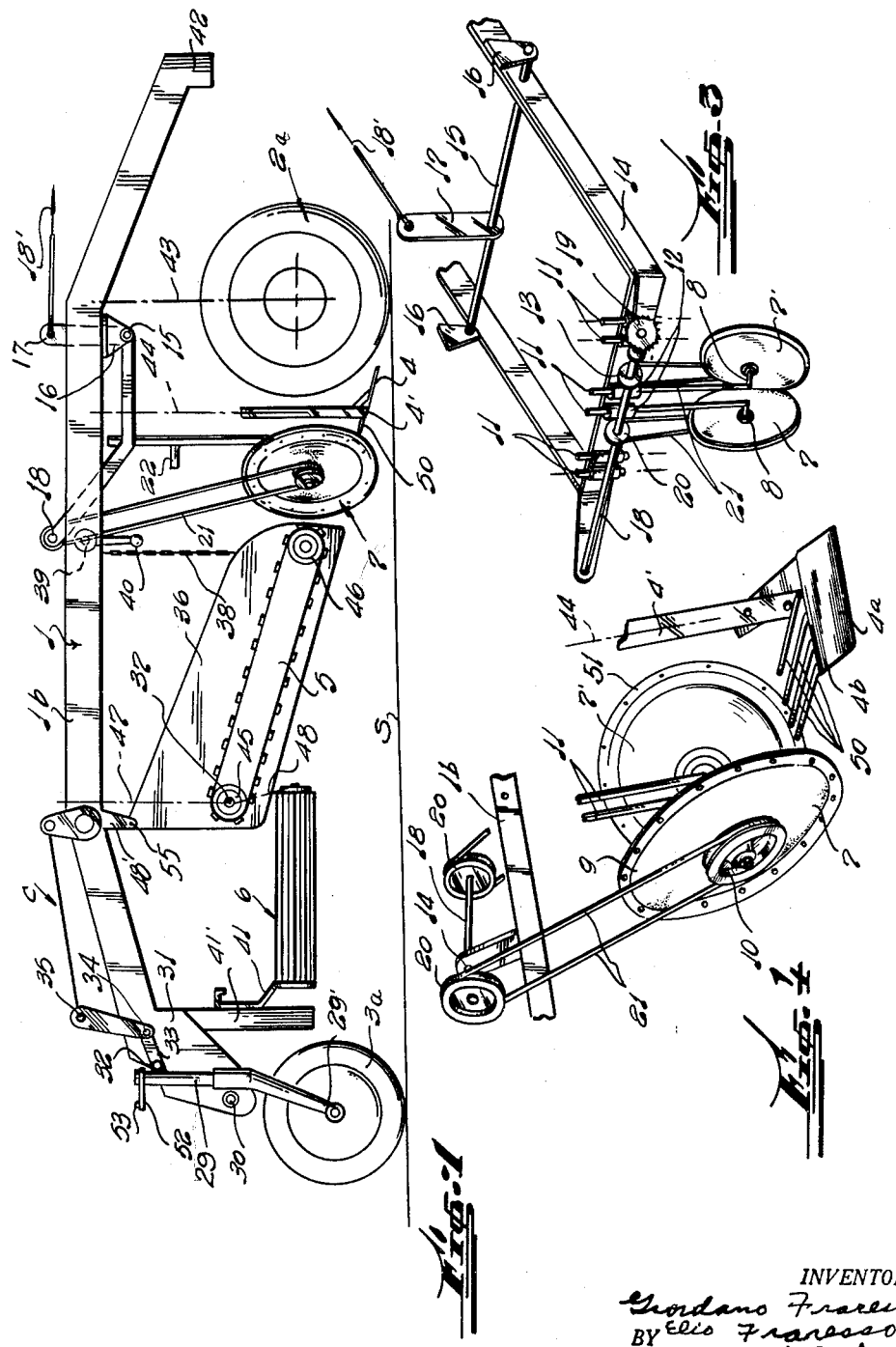
INVENTORS,
Giordano Fraresso
Elio Fraresso
BY Tashof & Ockeroff,
Attorneys

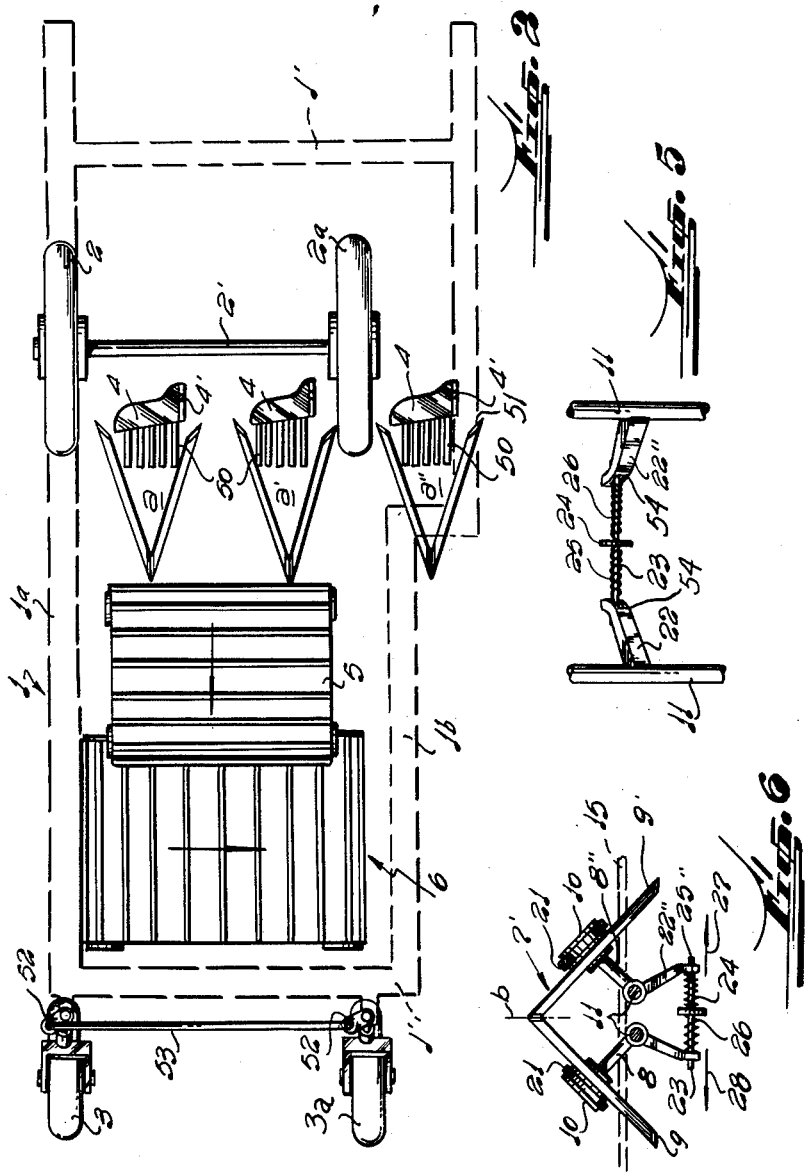

United States Patent Office 3,127,724
Patented Apr. 7, 1964

3,127,724
CUTTER-WINDROWER APPARATUS
Giordano Fraresso and Elio Fraresso, Laguna Larga,
Cordoba, Argentina
Filed May 11, 1961, Ser. No. 134,061
11 Claims. (Cl. 56—23)

This invention relates to a harvester and more particularly to a cutter-windrower used in the harvest of peanuts, soybeans, dry edible beans, and other similar crops, where an extremely gentle harvesting is required, in order to avoid that due to brusque handling the crop falls off the plant before being actually collected by the harvester proper.

Although the apparatus of the present invention may be used for several types of harvest, reference will now be made to peanuts, although this does not tend to limit the scope of this invention.

The apparatus according to the present invention may form part of a combine-harvester or may be a separate device and it may either receive the driving force from its own source, such as one of the ground wheels or from the power take-off of a tractor. The apparatus according to the present invention may be directly coupled to a tractor or any other suitable propelling means or may even be self-propelled.

Among the methods nowadays used for harvesting peanuts are the following:

(1) A method in which they are dug with a one- or two-row digger, windrowed and harvested later with a peanut picker.

(2) The once-over method, in which all operations are accomplished with the same machine.

The present invention is based on the arrangement as defined under item (1), although obviously the arrangement as defined under item (2) may be used as a basis, if any type of known harvesting arrangement is coupled to the apparatus of the present invention.

More particularly, the present invention refers to a cutter-windrower apparatus to be used for harvesting (i.e., cutting) peanuts and the like crops, either as a separate unit or forming part of a combine-harvester, comprising a frame supporting at least one and preferably a row of cutter blades, transversely arranged to the furrows of the soil, a pair of diverging rim portion contacting disks arranged behind each cutter blade, and means for driving said disks so as to raise the harvested (i.e., cut) plants upwardly and then deposit them on the soil defining rows of harvested, (i.e., cut) plants.

According to a more developed embodiment, the present invention refers to a cutter-windrower apparatus to be used for harvesting peanuts and the like crops either as a separate unit or forming part of a combine-harvester, comprising a frame supporting a row of spaced apart cutter blades transversely arranged to the furrows of the soil, a pair of diverging rim portion contacting disks arranged behind each cutter blade, means for driving said disks so as to raise the harvested plants upwardly and then deposit them on the soil defining rows of harvested plants, an endless conveyer behind said pairs of disks with the exception of the first lateral one, said first lateral one being adapted to gently deposit its row of harvested plants in line on the soil, said endless conveyer being adapted to collect the rows of harvested plants with the exception of the first lateral row and conveying means connected to said endless conveyer for discharging the collected rows of plants in line with said first lateral row of harvested plants on the soil.

In order to facilitate the comprehension of the present invention, reference will now be made to a preferred embodiment, in relationship to the accompanying drawings, wherein:

FIG. 1 is a schematic lay-out in side elevation of the apparatus, according to the present invention.

FIG. 2 is a schematic plane view of the apparatus of FIG. 1, with parts eliminated, so as to schematically illustrate only the fundamental aspects of the invention.

FIG. 3 is a perspective view of the supporting arrangement of the pairs of diverging rim contacting disks and associated elements, with parts removed.

FIG. 4 is a perspective view of a pair of disks with a pertinent cutter blade and associated parts, with parts removed.

FIG. 5 is a further detail in perspective view of the urging means for maintaining a pair of disks in contact by their rims.

FIG. 6 is a plan view of a pair of disks and associated parts.

As may be appreciated particularly in FIG. 1, the apparatus according to the present invention consists of a frame 1, which, as shown in FIG. 2, consists actually of a pair of side members, of which member 1a is a straight member while member 1b is a somewhat zig-zag member, so that the rear portion of the frame 1 is smaller than the front portion. Members 1a and 1b are schematically shown in FIG. 2 as linked together by binders 1'. According to the embodiment shown in the drawings, the frame 1 is supported in the front portion by a pair of wheels 2, 2a mounted on a shaft 2' suitably supported by the frame 1, which is only schematically shown by the dotted linking line 43 (FIG. 1). The rear portion of the frame 1 is supported by a pair of caster wheels 3, 3a in line with the respective front wheels 2, 2a. As to the caster wheels 3, 3a they are provided with means for graduating the height of the frame 1 with regard to the soil S (see FIG. 1), as will be later more specifically explained.

Behind the front wheels 2, 2a the frame supports a row of spaced apart cutter blades 4 (see FIGS. 2 and 4) each of which has a lateral upwardly raising supporting member 4' (see also FIG. 1) which are linked in a suitable way to the frame 1, such as schematically indicated by means of the dotted linking line 44. If desired the upper portion of the supporting members 4' may be connected to a mechanism (not shown) for graduating the position of the blades 4, as it is already well known by those skilled in the art and therefore does not require specific illustration. The cutting blades 4 are downwardly inclined with regard to the soil S having a front cutting edge 4a, while the rear edge 4b supports a grid 50, the free end of which projects into a pair of converging disks 7, 7' (see FIG. 4), to which reference will be made later on.

According to the embodiment shown in FIG. 2, it will be appreciated that this particular apparatus is adapted to harvest simultaneously three rows of plants.

A first inclined endless conveyer 5 having a width, in this embodiment, equal to two cutter blades, is located behind said cutter blades and associated disks. The upper end of said first endless conveyer 5 ends above a second endless conveyer 6, perpendicularly arranged to said first endless conveyer 5 and adapted to discharge the plants received, as will be later seen, in the row corresponding to the cutter blade 4 located on the outer side of the front wheel 2a and therefore not within the sphere of the first endless conveyer 5.

A pair of diverging rim portion contacting disks 7, 7' is arranged behind each cutter blade 4. The opening defined between said pair of disks 7, 7' is directed towards the pertinent cutter blade 4. To facilitate the explanation of the invention, as far as said pairs of disks 7, 7' is concerned, it will be appreciated that each unit has likewise been identified with reference characters $a$, $a'$ and $a''$ respectively, and units $a$, $a'$ are located in the sphere of the first endless conveyer 5 and the pertinent cutter blade 4 of unit $a''$ (hereinafter called "lateral" unit) is located in the same transverse row as units $a$ and $a'$, in a portion which is not covered by the first endless conveyer 5.

If it will be assumed that the cutter blades 4 are capable of cutting and shifting forward by means of the grid 50, the plants which have been separated from the soil, it will be understood that each plant which has been raised by unit $a''$ will fall behind the unit in a row as the machine moves forward. The plants raised by units $a$ and $a'$ will fall onto the first conveyer 5 which transports them towards the second conveyer 6. Conveyer 6 will discharge the two rows of plants onto the row of harvested plants of the lateral unit $a''$.

Referring now in particular to FIGS. 3 to 6, as to the structural details of the units $a$, $a'$ and $a''$ each of which are based on the same structural principle, it will be appreciated that each pair of disks 7, 7' is arranged in converging planes defining a diverging opening directed towards the pertinent blade 4, as already previously described, in such a way that the contacting rim portions are contacting at a generatrix plane $b$, as shown in FIG. 6.

Each disk is rotatably mounted on a shaft 8 which is perpendicular to the disk itself, such as shown in FIG. 3. In order to gently contact the rims of the disks, each rim 9 is preferably sheathed with a rubber band 51, FIG. 4, and which is sloped with regard to the main surface of the disk.

It will be appreciated that each disk 7 could be replaced by other structures (not shown) having a rubber surface at least at the rim.

Each pair of contacting rubber bands 51 mounted on the rims 9 assures that as the machine moves forward, each pair will raise gently the plants towards the first endless conveyer 5 or simply raise the plants in case it is the lateral unit $a''$, without too many vibrations in order to avoid that the crops will fall off the plant.

Each shaft 8 passes through disk 7, 7' and further supports, adjacent the outer face of each disk, a pulley 10 for driving each disk 7, 7' as will be later explained.

The inner end of each shaft 8 is rigidly connected to a vertical rod 11 rotatably supported by a bushing 12 (see FIG. 3) mounted on a cross-plate 13 which supports all disks 7, 7', although only one is fully shown in FIG. 3. The cross-plate 13 is rigidly connected at both ends to the central portion of a pair of swingable levers 14 one end of each of which is rigidly connected to a height graduating shaft 15 supported by a pair of brackets 16 on the frame 1 and having in its central portion an upwardly projecting lever 17 connected to a control arrangement, only schematically indicated by arrow 18' which is operable from the front end of the apparatus or from the tractor (not shown), enabling to raise or lower the cross plate 13 and thereby the pair of disks 7, 7' with regard to the soil. The bushings 12 allow rods 11 to turn on their respective axes.

The other end of the swingable levers 14 rotatably support a driving shaft 18 one end of which projects out of one of the swingable levers 14 and supports a chain gear 19 to be connected to a driving source (not shown) which may either be a direct driving source or connected with a suitable transmission system to the power take off of the tractor (not shown), as will be obvious to anybody skilled in the art.

The driving shaft 18 supports a plurality of spaced apart pulleys 20 each of which is connected to a pertinent pulley 10 of one of the disks 9, through a suitable belt 21 (see FIGS. 3 and 4).

In order to resiliently urge together the contacting portions of the rims 9 of each pair of disks 7, 7', the rods 11 (see FIGS. 5 and 6) have secured thereto a rearwardly projecting arm 22 the free end of each of which has a slot 54 in which a rod 23 is arranged. This rod 23 has in its middle portion a rigidly mounted washer 24, dividing said rod 23 into two portions. Rod 23 supports a pair of compression springs 25, 26 each of which abuts by one of its ends with said washer 24 and by its other end with the free ends of said arms 22, whereby said free ends of said arms 22 are tending to separate and thus the disks 7, 7' are urged together at their contacting rim portions, as schematically shown in FIG. 6 and identified by arrows 27, 28. Obviously, by providing suitable springs 25 and 26, the pressure may be controlled at will.

The position of the frame 1 with regard to the soil may be varied by means of the rear, or caster, wheels 3, 3a, which to this end comprise each, as best shown in FIG. 1, a vertical shaft 29 ending in a fork member 29'. The base portion of the fork member 29' is pivoted to a horizontal shaft 30 mounted on a projecting portion 31 of the frame 1 (only shown in FIG. 1). The upper end portion of shaft 29 butts against a roller 32 mounted on the free end of a bell crank lever 33 pivoted at 34 and the other arm of which is connected to a control shaft 35. Control shaft 35 is connected to an inclination control mechanism, only schematically indicated by C which is to be controlled either on the frame 1 or from the tractor, as will be obvious to those skilled in the art. A projecting arm 52 (see FIGS. 1 and 2) is rigidly connected to the upper end of each shaft 29 and both arms 52 are pivotally linked together by a cross rod 53, so as to assure that both caster wheels 3, 3a will swing in unison.

The first endless conveyer 5, as may be best seen in FIG. 1 is arranged in a pair of lateral plates 36 (only one being visible in FIG. 1) on a pair of rollers 45, 46 of which roller 45 is mounted on a shaft 37 to be considered as the driving shaft which is driven by means of a driving connection, schematically indicated by dotted line 47 in turn to be connected to a central drive or to the power take off of the tractor, as will be obvious to those skilled in the art. Each lateral plate 36 is connected by its rear portion to a link 48' in turn pivotally supported by the pivot 55 supported by the frame 1, while the forward end portions of the lateral plates 36 are supported by a chain 38 which in turn is controlled by a chain gear 39, rotatably supported on the frame 1 and having a suitable handle 40, whereby the height of the first endless conveyer 5, with regard to the soil S may be suitably controlled, as will be evident to those skilled in the art.

As to the second endless conveyer 6, dotted line 48 simply indicates a transmission driving arrangement for transmitting the movement likewise to said second endless conveyer 6, which is supported by means of a lateral bracket 41 on a downwardly projecting member 41', rigidly connected to the frame 1, and only shown in FIG. 1.

The front end portions of the frame 1 are provided with suitable connecting members, only schematically shown at 42 in FIG. 1, to suitably connect the apparatus for instance to the tractor. It will be obvious that the rear of the apparatus can be supported by means other than the rear wheels 3 when the apparatus forms part of a combine-harvester.

As may be appreciated in FIG. 2, the front wheel $2a$ is arranged between the units $a'$ and $a''$ and in line with the rear or caster wheel $3a$, while the front wheel 2 which is outside the frame 1 is arranged in line with the rear wheel 3. In view of the fact that the wheels $2a$ and $3a$ are not arranged on the outside of the machine but in between the units $a'$ and $a''$, it is avoided that the wheels $2a$, $3a$ have to move in a furrow where a previously harvested row of peanut plants lies.

As such it will be understood that the number of units $a$, $a'$, $a''$ may be varied at will, and the basic concept could be expressed by an apparatus (not shown) having only the unit $a''$ and associated parts, wherefrom it will likewise be seen that one of the outstanding features of the present invention is the fact that the pair of disks 7, 7′ is capable of raising the plant without too many vibrations.

As many embodiments may be made of this inventive concept and as many modifications may be made in the embodiment hereinabove shown and described, it is to be understood that all matter herein is to be interpreted merely as illustrative and not in a limited sense.

We claim:

1. A cutter windrower apparatus to be used for cutting peanuts and the like crops comprising a frame supporting at least one cutter blade transverse to the longitudinal axis of the apparatus and adapted to cut a plant, a pair of rotatable diverging rim portion contacting disks arranged behind said cutter blade, said diverging disks being disposed to receive and provide a support for said cut plant, said rim of each of said contacting disks including resilient means and means for rotating said disks so as to raise the cut plants upwardly and letting them fall behind said disks in an aligned row.

2. In a cutter windrower apparatus to be used for cutting peanuts and the like crops, frame supporting a row of cutter blades transversely arranged to the longitudinal axis of the apparatus and adapted to cut plants, a pair of diverging rim portion contacting disks arranged behind each cutter blade, said diverging disks being disposed to receive and provide a support for said cut plant, and means for rotating said disks so as to raise the cut plants upwardly and then deposit them on the soil defining rows of cut plants.

3. In a cutter windrower apparatus to be used for cutting peanuts and the like crops a frame supporting a row of spaced apart cutter blades transversely arranged to the longitudinal axis of said apparatus, a pair of diverging rim portion contacting disks arranged behind each cutter blade means for rotating said disks, said pairs of disks being aligned perpendicularly to the longitudinal axis of said apparatus, said pairs of disks including an outer lateral pair, an endless conveyer behind said pairs of disks with the exception of the lateral pair, said lateral pair being adapted to gently raise and then deposit its row of cut plants in line on the soil, said endless conveyer being adapted to collect the rows of cut plants with the exception of said lateral one and conveying means connected to said endless conveyer for discharging the collected rows of plants in line with said first mentioned row of cut plants on the soil.

4. The cutter windrower apparatus as claimed in claim 3, wherein each disk of each pair of disks is outwardly inclined with regard to a vertical plane passing through the portion of contacting rims of said pair of disks.

5. The cutter windrower apparatus as claimed in claim 4, wherein said disks are controllable in height.

6. The cutter windrower apparatus as claimed in claim 5, wherein each of said disks has a first shaft rotatably supporting said disk, said first shaft passing through said disk having an outer face, a pulley mounted adjacent the outer face of said disk on said first shaft, a driving shaft, a belt mounted on said pulley and connected to said driving shaft, said first shaft rotatably supporting said disk having an inner end, a vertical rod, a crossplate, a pair of swingable levers, said inner end being rigidly connected to said vertical rod in turn rotatably supported by said cross plate in turn mounted between said pair of swingable levers, swingably supported by said frame, and means for controlling the position of said swingable levers.

7. The cutter windrower apparatus as claimed in claim 6, wherein said vertical rods including means for resiliently urging said contacting portions of said rims of said disks together.

8. The cutter windrower apparatus as claimed in claim 7, wherein said vertical rods comprising a pair of rearwardly projecting arms each having a free end, a rod mounted in the free ends and including in its middle portion a fixed washer, a compression spring mounted on each side of said fixed washer and resiliently abutting against said washer and the free end of the pertinent arm.

9. The cutter windrower apparatus as claimed in claim 3, wherein said frame including a pair of front wheels and a pair of rear wheels, one front wheel being located outside said frame and one rear wheel being alined with said front wheel, the other front wheel being arranged between the outer cutter blade and the next cutter blade and the other rear wheel being alined with said other front wheel.

10. The cutter windrower apparatus as claimed in claim 9, wherein said rear wheels including means capable of varying the inclination of said rear wheels with regard to said frame to graduate the height of said frame with regard to the soil.

11. A cutter windrower apparatus to be used for cutting peanuts and the like crops comprising a frame supporting at least one cutter blade transverse to the longitudinal axis of the apparatus and adapted to cut a plant, a pair of rotatable diverging disks, a portion of the rim of one of said disks contacting the corresponding portion of the rim of the other of said disks, said pair of disks being arranged behind said cutter blade, said diverging disks being disposed to receive and provide a support for said cut plant, said disks contacting each other at a point above the lowermost extremities of the disks, said rim of each of said contacting disks including resilient means and means for rotating said disks so as to raise the cut plants upwardly and letting them fall behind said disks in an aligned row.

References Cited in the file of this patent

UNITED STATES PATENTS

| | | |
|---|---|---|
| 1,112,344 | Webber et al. | Sept. 29, 1914 |
| 1,182,149 | Douglass | May 9, 1916 |
| 1,288,541 | Fant | Dec. 24, 1918 |
| 2,669,820 | Falkner | Feb. 23, 1954 |
| 2,681,537 | Heth et al. | June 22, 1954 |
| 2,722,794 | McGee | Nov. 8, 1955 |
| 2,888,081 | Hammer et al. | May 26, 1959 |
| 2,972,383 | Erdman | Feb. 21, 1961 |